(12) United States Patent
Gallagher

(10) Patent No.: US 7,630,608 B2
(45) Date of Patent: Dec. 8, 2009

(54) EXPANDABLE FIBER MANAGEMENT

(75) Inventor: Jeremy James Gallagher, Spokane, WA (US)

(73) Assignee: Telect Inc., Liberty Lake, WA (US)

( * ) Notice: Subject to any disclaimer, the term of this patent is extended or adjusted under 35 U.S.C. 154(b) by 0 days.

(21) Appl. No.: 12/139,375

(22) Filed: Jun. 13, 2008

(65) Prior Publication Data

US 2008/0310810 A1     Dec. 18, 2008

Related U.S. Application Data

(60) Provisional application No. 60/944,523, filed on Jun. 17, 2007.

(51) Int. Cl.
*G02B 6/00* (2006.01)
(52) U.S. Cl. .................................... 385/135
(58) Field of Classification Search ................. 385/135
See application file for complete search history.

(56) References Cited

U.S. PATENT DOCUMENTS

| | | | | |
|---|---|---|---|---|
| 5,040,095 A | * | 8/1991 | Beaty et al. | ................. 361/694 |
| 5,708,751 A | * | 1/1998 | Mattei | ........................ 385/135 |
| 6,631,237 B2 | * | 10/2003 | Knudsen et al. | ............. 385/134 |
| 7,149,398 B2 | | 12/2006 | Solheid et al. | |
| 7,462,779 B2 | * | 12/2008 | Caveney et al. | ............ 174/68.1 |

FOREIGN PATENT DOCUMENTS

JP     10096833 A    4/1998
KR  20040102376 A  12/2004

* cited by examiner

*Primary Examiner*—Sarah Song
(74) *Attorney, Agent, or Firm*—Lee & Hayes, PLLC

(57) ABSTRACT

A communications management system includes a cabinet, a chassis, and a panel for mounting optical circuits. In one implementation, the chassis is coupled to the cabinet and slides outward from the cabinet and the panel is coupled to the chassis and pivots about an axis that is perpendicular to the direction that the chassis slides. A communications management system my include a cabinet with substantially parallel first and second surfaces. In one implementation, one of the surfaces contains a provision for attaching the cabinet to a second cabinet and a feature for passing a communications fiber from the cabinet to the second cabinet. A second communications management system includes panel for mounting optical circuits. In one implementation, the panel includes a feed adapter for terminating optical fibers that are in use and a parking lot for terminating optical fiber that are not in use.

18 Claims, 9 Drawing Sheets

EXPANDABLE FIBER MANAGEMENT

RELATED APPLICATION

This application claims the benefit of U.S. Provisional Application No. 60/944,523 (TL1-0119USP1), filed Jun. 17, 2007 which is incorporated by reference herein.

TECHNICAL FIELD

The following disclosure relates generally to expandable fiber management, fiber management systems, and failure restoration techniques.

BACKGROUND

Optical fibers can transmit large volumes of digital data and voice signals over relatively long distances, with little or no signal loss. For this reason, optical fibers are widely used in the telecommunications field. As the use of optical fibers has increased, new systems have been developed for managing and organizing the larger numbers of optical fibers.

For example, typical optical fiber management systems include cable management structures for storing the fibers or connecting the fibers to one or more other fibers and/or fiber optic devices, such as attenuators, connectors, switches, multiplexers, splitters/combiners, or splices. Such fiber management systems are often mounted to a wall, a utility pole, or any other suitable mounting structure, including the ground. However, in such systems, it is often difficult to access the optical connectors, splices, etc., to connect or disconnect the optical fibers. Accordingly, there is a need for a fiber management apparatus that provides easy, unimpeded access to the optical fibers in the apparatus.

In addition, with the increasing use of optical fiber for digital communications (e.g. video, music, photography, gaming, etc.) there is an ongoing need for additional optical fiber capacity to meet these needs. However, the cost to install additional optical fiber can be prohibitably expensive. Moreover, there may be little or no space on walls, utility poles or on the ground to install these additional optical fiber systems. Accordingly, there is a need for a fiber management system that is cost effective to install and that takes up a minimal amount of additional space.

Finally, with the broad adoption of optical fiber and consumers dependence on digital communications to conduct business, communicate with friends and family members, receive digital content, etc. today's optical fiber communication systems must be robust and reliable. Since a single optical fiber is approximately the size of a human hair it is relatively easily to damage or break a fiber. Accordingly, there is a need for a method of replacing individual optical fibers quickly and easily.

SUMMARY

Structures and techniques for managing, expanding, and/or restoring communications networks are disclosed. In one aspect, a communications management apparatus may include a cabinet, a chassis coupled to the cabinet, and a panel coupled to the chassis with a hinge. The chassis may be slideable outward from the cabinet and the panel may pivot relative to the chassis to expose the optical circuits on the back of the panel.

In another aspect, a method for managing fibers may include, for example, opening a cabinet to access a chassis and a panel, sliding the chassis outward from the cabinet and pivoting the panel relative to the chassis to access circuits on the back of the panel.

In another aspect, a communications equipment management system may include a first cabinet with a first access feature for routing a communications fiber from the first cabinet, a second cabinet with a second access feature for routing the communications fiber to the second cabinet, an attachment provision to attach the first cabinet to the second cabinet, a sealing provision to seal a junction between the first cabinet and the second cabinet, and a pass-through for routing the communications fiber from the first cabinet through the pass-through and the first access feature to the second cabinet through the second access feature.

In another aspect, a method of managing communications equipment may include providing a first cabinet to manage a communications fiber, the first cabinet including a first access feature and a pass-through for routing communications fiber from the first cabinet. Providing a second cabinet for managing a communications fiber, the second cabinet including a second access feature for routing communications fiber to the second cabinet. Then placing the second cabinet proximate the first cabinet such that communications fiber may pass from the first cabinet through the pass-through and the first access feature to the second cabinet through the second access feature, and attaching the first cabinet to the second cabinet.

In another aspect, a device may include a cabinet and a panel coupled to the cabinet for mounting optical circuits. The panel may include at least one feed adapter for terminating optical fiber that are in use and a parking lot for terminating optical fibers that are not in use.

In another aspect, a method for restoring fiber optic communication may include terminating at least one optical fiber in a parking lot for future use. If failure of an optical fiber is detected, the damaged optical fiber can be replaced with the terminated optical fiber to restore fiber optic communications.

BRIEF DESCRIPTION OF THE DRAWINGS

The detailed description refers to the accompanying figures. In the figures, the left-most digit(s) of a reference number identifies the figure in which the reference number first appears. The use of the same reference numbers in different figures indicates similar or identical items.

DETAILED DESCRIPTION

This disclosure is directed to apparatus and techniques for managing fibers, fiber management devices, techniques for expanding fiber optic networks, and methods for restoring fiber optic communications. Some apparatuses and techniques are described in the context of a chassis for managing optical fiber. Also, techniques for restoring fiber optic communication are described in the context of a panel. However, the apparatuses and techniques described herein may be used in other environments and are applicable to other contexts. In addition, the apparatuses, systems and methods may be used to manage fibers other than optical fibers, such as wire and the like.

Illustrative Apparatus for Managing Optical Fiber

Once optical fibers are installed in a fiber management apparatus, there is still a need to access the fibers and connections to, for example, perform testing, connecting patch fibers, splicing fibers, rerouting fibers, or otherwise servicing one or more fibers or fiber optic devices. In conventional fiber management apparatuses it is often difficult or cumbersome to access the fibers managed by the fiber management apparatuses due to, for example, tightly packed components, small clearances between moving parts, and the like.

Figure 1:
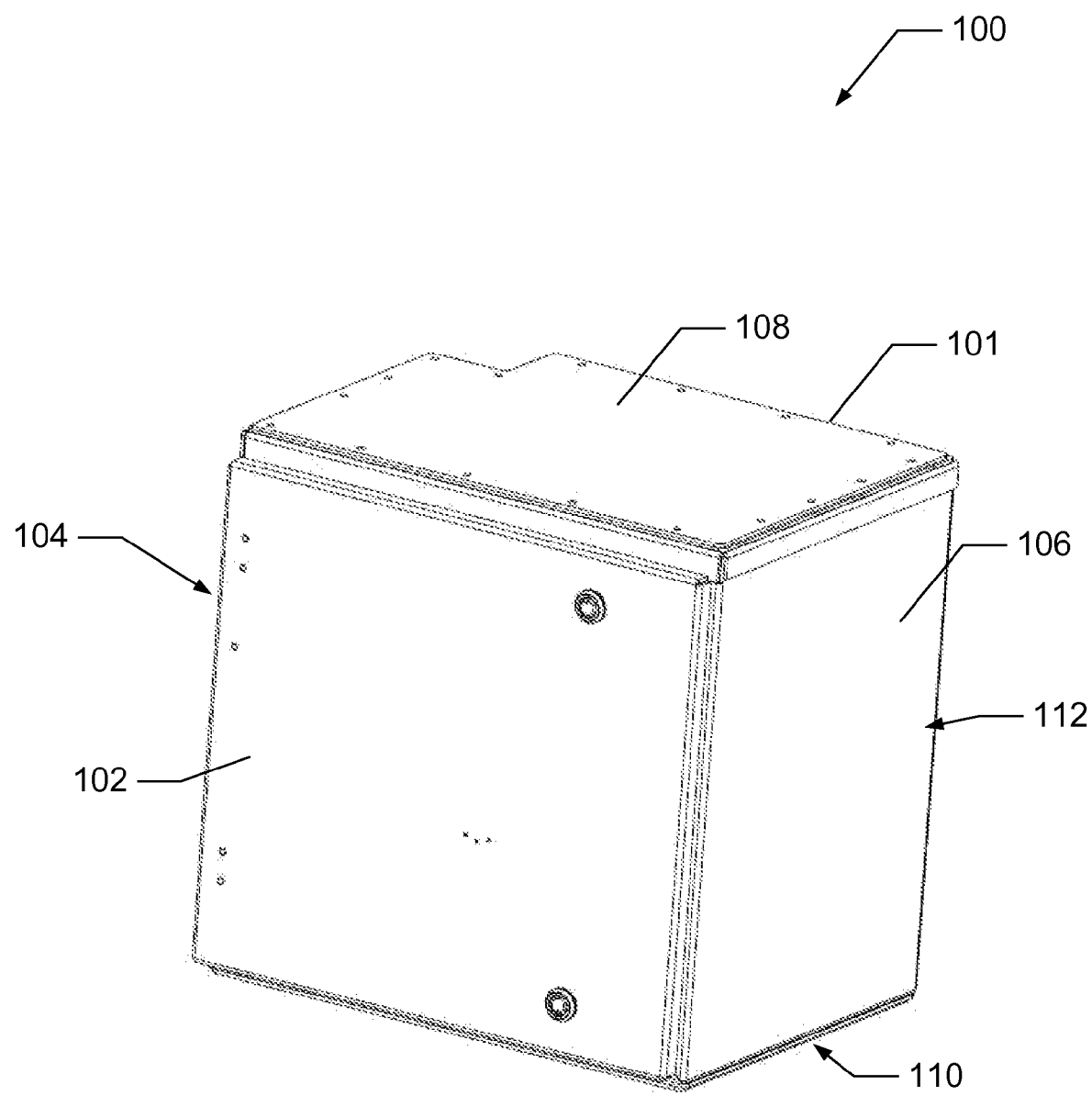
FIG. 1 is perspective view of an illustrative apparatus for managing optical fiber, according to one implementation, including an access door.

FIG. 1 illustrates an illustrative apparatus for managing optical fiber 100, which contains a cabinet 101, a chassis, and a panel (not show). The cabinet 101 includes an access door 102 for accessing the chassis and panel residing inside the cabinet 101. The cabinet 101 also includes a left surface 104, a right surface 106, a top surface 108, a bottom surface 110 and a back surface 112. The cabinet 100 may also contain provisions to mount the cabinet 101 to a utility pole, the wall of a structure or on the ground (e.g. on a concrete pad) (not shown).

Figure 2:
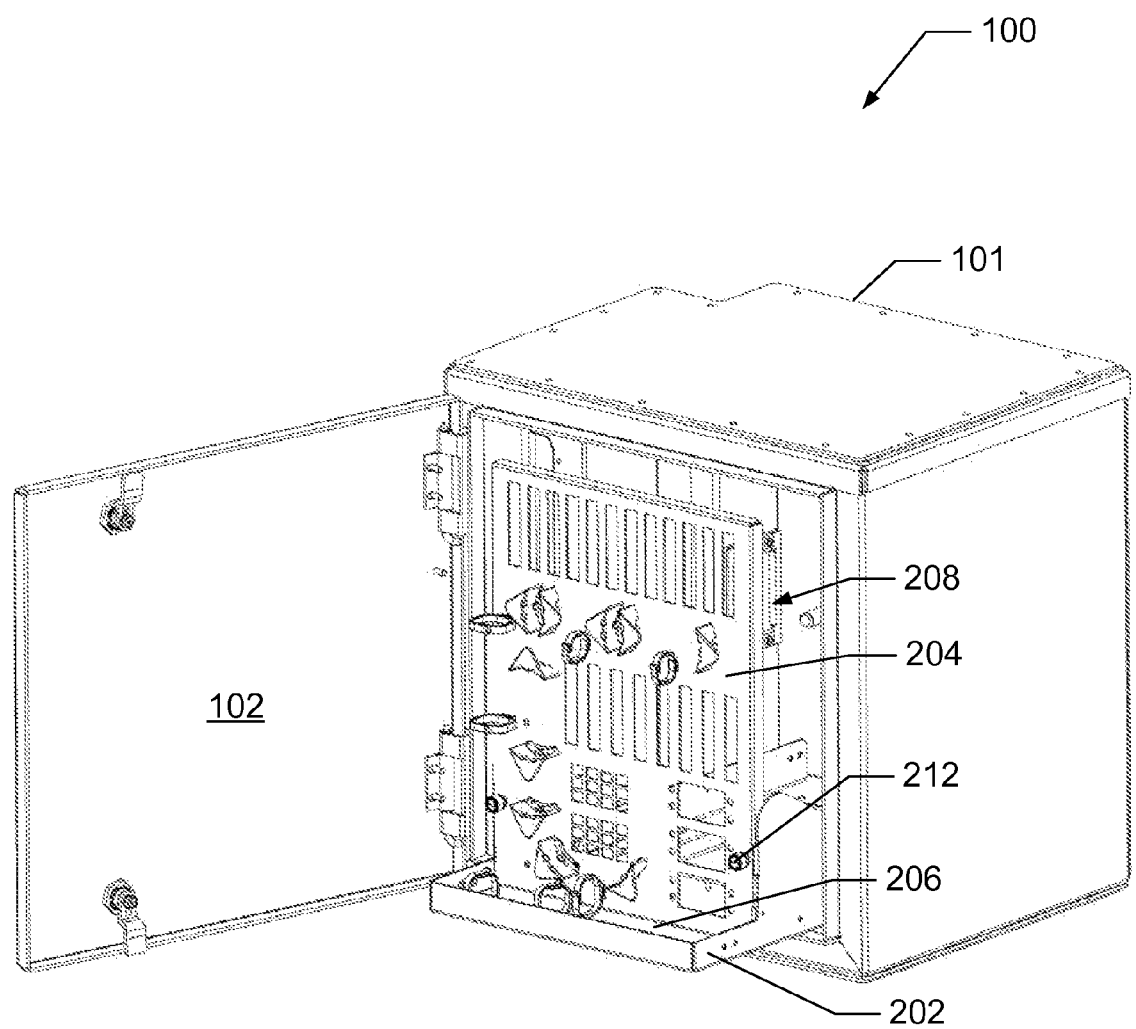
FIG. 2 is a perspective view of the apparatus of FIG. 1, with the access door open to expose a chassis and panel.

FIG. 2 illustrates apparatus 100 with the access door 102 open and the chassis 202 extended outward form the cabinet 101 to expose panel 204 and the optical circuits and components mounted to the panel 204. The optical components may include splices, attenuators, connectors, switches, multiplexers, splitters/combiners, and the like.

In the illustrative embodiment, the chassis 202 is attached to the interior of the cabinet 101 with slides, linear bearings, or other mechanical mechanisms that allow the chassis 202 to extend outward from the cabinet 101. This allows a service technician or repair person to access the optical circuits, and components (not shown) that are mounted to the panel 204. In one embodiment, the chassis 202 extends about nine inches beyond the cabinet 101. However, the chassis 202 could be designed to extend a greater or lesser distance depending on the depth of the cabinet 101, the height of the panel 204 and the amount of access required to expose the back of the panel 204. In other implementations, the chassis 202 could additionally or alternatively be configured to pivot relative to the cabinet 101, be removable from the cabinet 101, and/or be otherwise movable relative to the cabinet 101.

In the illustrative embodiment, the panel 204 is attached to the chassis 202 with a hinge or other attachment mechanism that allows the panel 204 to pivot or rotate relative to the chassis 202. In one embodiment, the panel 204 is attached to the top surface of the chassis 206 and the panel 204 pivots or tips downward (outward) to provide access to the back of the panel 208. However, it should be recognized that the panel 204 could be attached to the chassis 202 in a number of different configurations, so long as the panel 204 pivots relative to the chassis 202. For example, the panel 204 could pivot horizontally either toward or away from the access door 102 or the bottom of the panel 202 could pivot upward to expose the back of the panel 208. In other implementations, the panel 204 may be fixed relative to the chassis 202 or slideable relative to the chassis 202. In yet other implementations, the panel and chassis may be integrated together.

The panel 204 may also include an attachment device 212 for securing the panel 204 to the chassis 202 and preventing it form pivoting until the attachment device 212 is disconnected from the chassis 202. The attachment device may include a screw, bolt, cam lock or other suitable device for attaching the panel 204 to the chassis 202.

Figure 3:
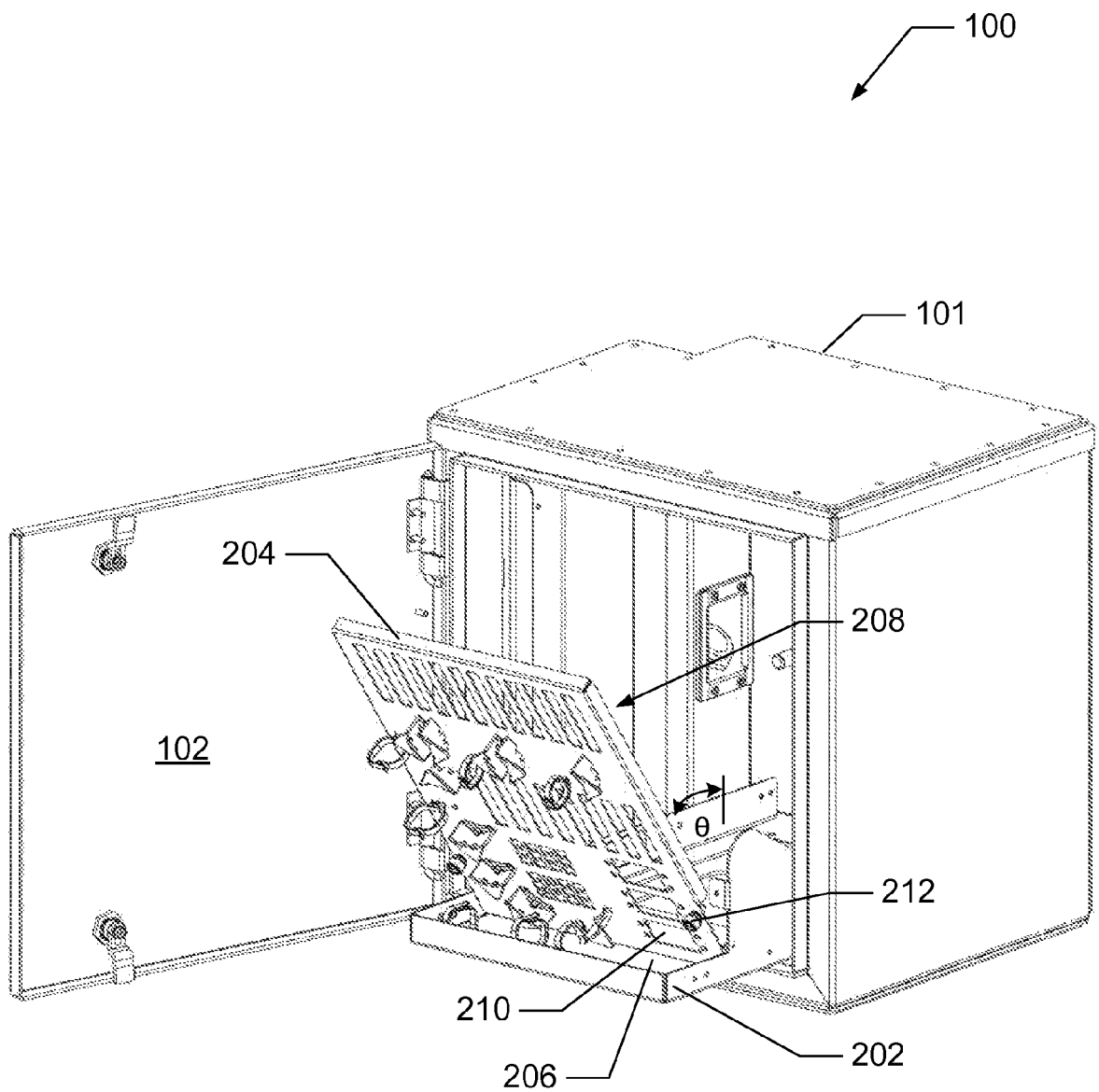
FIG. 3 is a perspective view of the apparatus of FIG. 2, shown with the chassis extended and panel pivoted downward/outward.

FIG. 3 depicts the chassis 202 extended outward from the cabinet 101 with the panel 204 pivoted downward through an angle ($\theta$) exposing the fiber optic circuits and components (not shown) that are attached to the back of the panel 208. From this orientation a service technician or repair person can easily access the circuits and components to add additional circuits, make repairs, or other activities requiring access to the back of the panel 208. In one implementation, the panel 204 is pivoted through an angle ($\theta$) of approximately 90 degrees to approximately 45 degrees relative to the top surface of the chassis 206. In another implementation, the angle ($\theta$) is between about 90 and about 60 degrees relative to the top of the chassis 206. Furthermore, the panel 204 may include an access door 210 for accessing the fiber optic circuits and components on the back of the panel 208.

Figure 4:
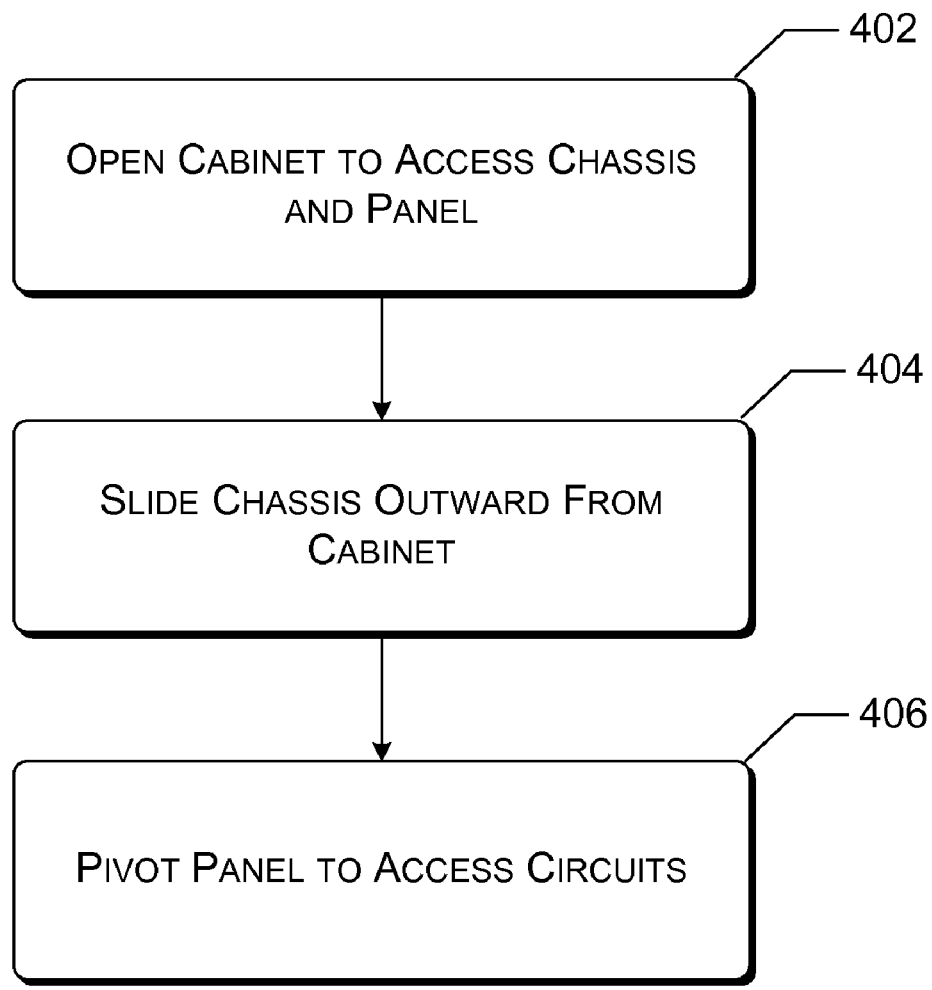
FIG. 4 is a flowchart depicting an illustrative method of managing optical fiber.

FIG. 4 is a flow chart depicting an illustrative method of managing optical fibers using the apparatus for managing optical fiber 100. The cabinet access door 102 is unlocked and opened to expose the chassis 202 and panel 204, at block 402. Alternatively, the cabinet could be opened by removing the door 102 from the cabinet 101, sliding the door 102 sideways, rolling the door 102 up, or other methods of providing access to the interior of the cabinet 101. The chassis 202 is then extended outward from the cabinet 101 to provide access to the panel 204, at block 404. As previously noted, the chassis 202 may be attached to the cabinet 101 with slides, linear bearings or other attachment devices that allow the chassis 202 to extend outward from the cabinet 101. The attachment device 212 is disconnected from the chassis 202 and the panel 204 is pivoted forward to provide access to the back of the panel 208, at block 406. Once the panel 204 has been pivoted forward to expose the back of the panel 208, a technician or repair person can access the optical circuits mounted to the back of the panel 208.

Illustrative Optical Fiber Management System

As noted previously, there is a need for additional optical fiber capacity to meet the needs of business and consumers. However, the cost to install additional optical fiber can be prohibitably expensive partially because of the space and time need to install additional fiber optic components. Accordingly, there is a need for an optical fiber management systems that are cost effective to install and that take up a minimal amount of space.

Figure 5:
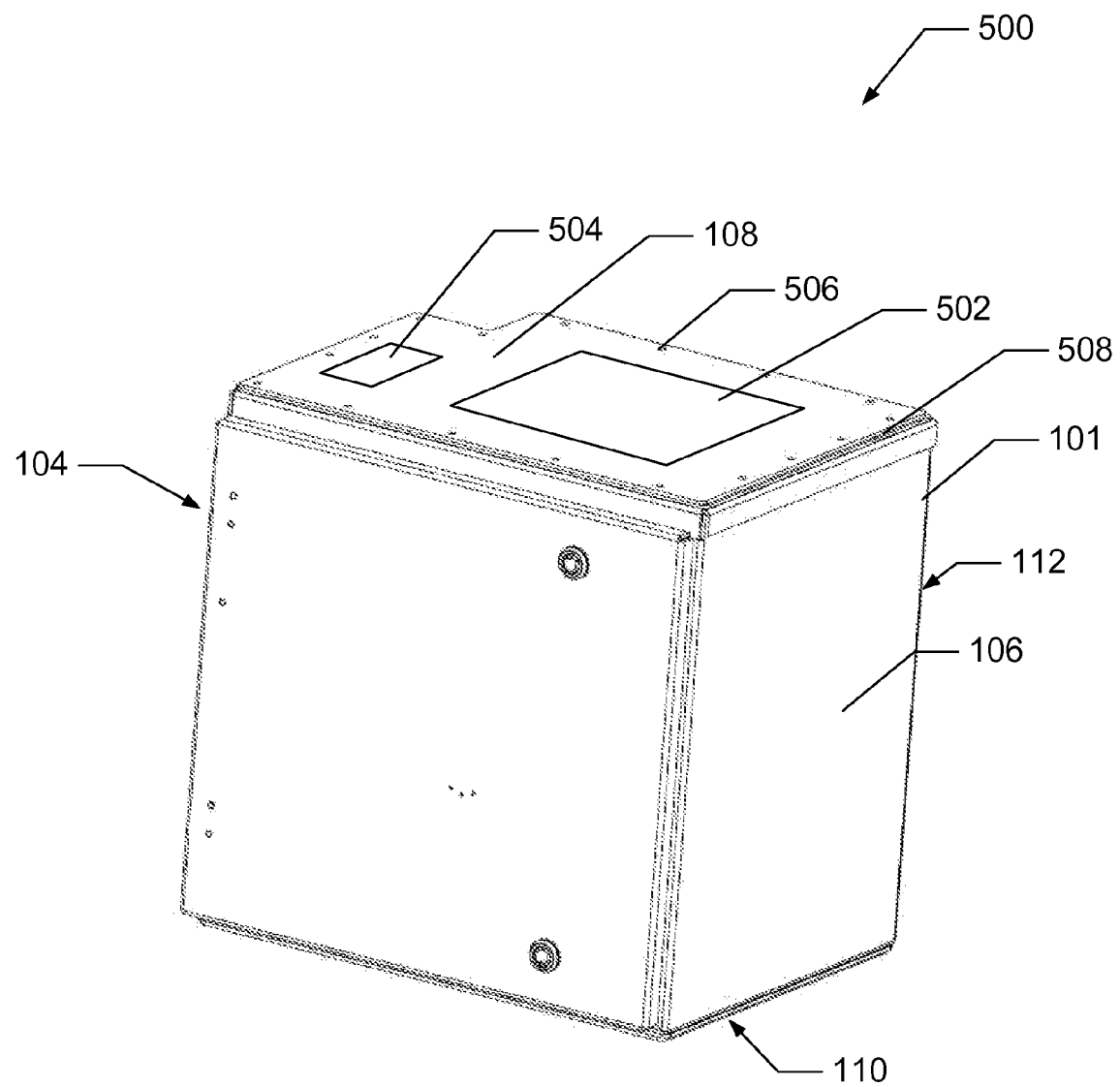
FIG. 5 is a perspective view of an illustrative optical fiber management system, including provisions for passing optical fibers to a second optical fiber management device.

FIG. 5 depicts an optical fiber management system 500 for managing optical fiber. The fiber management system 500 may include a cabinet 101 for containing fiber optic components, a removable panel 502 for accessing the interior of the cabinet 101, a pass-through 504 for routing fiber optic cables through the cabinet 101, and attachment provisions 506 for attaching the system 500 to other systems 500.

The removable panel 502 is attached to the cabinet 101 such that it may be removed to provide access to the optical components residing within the cabinet 101. The removable panel 502 is attached to the cabinet with one or more attachment devices such as screws, bolts, cam locks, rivets or other suitable removable fasteners. It should be appreciated that while the removable panel 502 is shown on the top surface 108 of the cabinet 101, removable panels 502 may additionally or alternatively be located on the left side 104, the right side 106, the bottom surface 110, or the back surface 112 of the cabinet 101.

Figure 6:
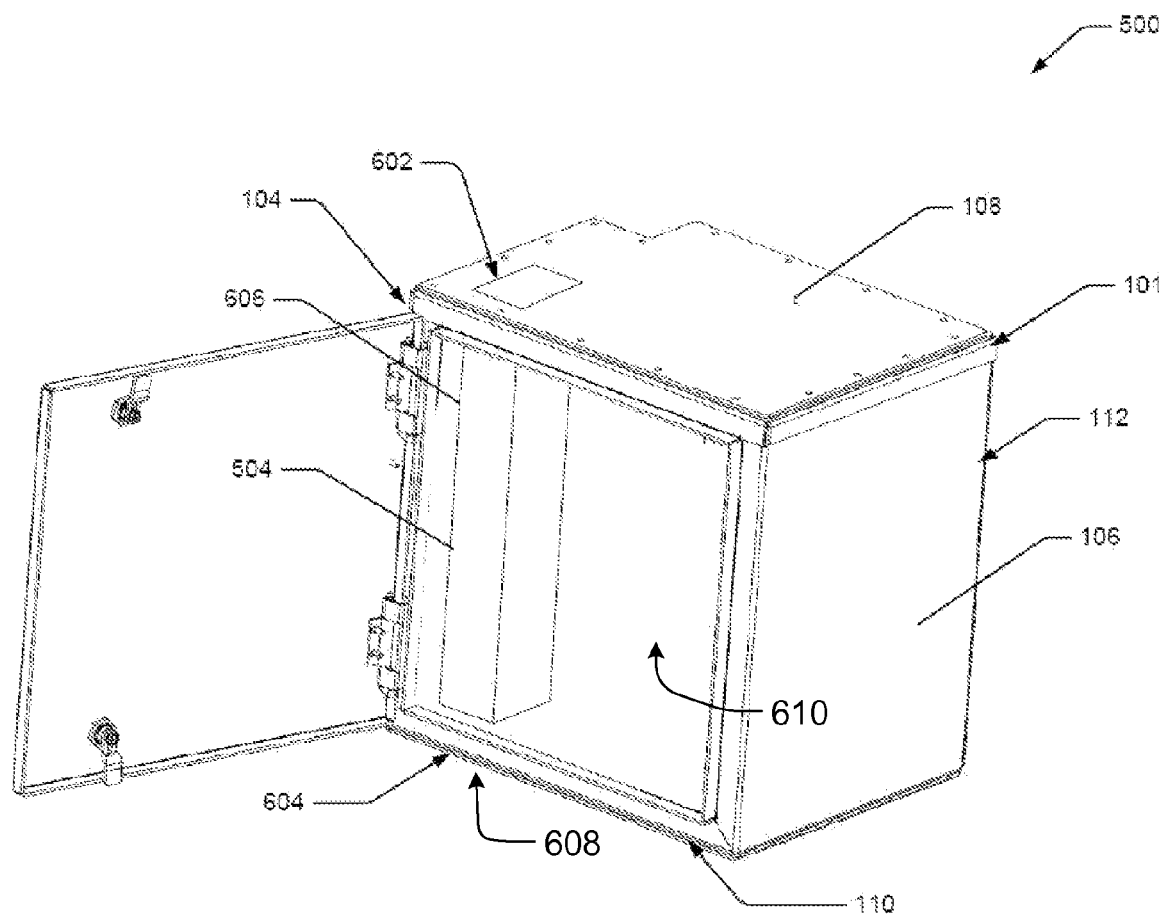
FIG. 6 is a perspective view of the optical fiber management device of FIG. 5, with the access door open to illustrate a pass through for optical fiber.

FIG. 6 depicts the optical fiber management system 500 including a pass through 504 for running fiber optic cables through the cabinet 101. The purpose of the pass through 504 is to isolate the optical fiber from the interior of the cabinet 101 so that it can be run through the cabinet without interfering with the other contents of the cabinet 101 (e.g., the chassis, other optical fiber cables, optical components, etc.).

The pass through 504 includes a first opening 602, a second opening 604, and a conduit 606. The pass through 504 is shown running from the top surface 108 of the cabinet 101 to the bottom surface 110 of the cabinet 101. However, it should be appreciated that the pass thorough 504 could run between any two surfaces of the cabinet 101. For example, from the left side 104 of the cabinet 101 to the right side 106 of the cabinet 101. The exemplary pass through 504 is also shown running along an inner corner of the cabinet 101. However, the pass through 504 could run through any location within the cabinet 101 or externally along an outer surface of the cabinet 101. Furthermore, the exemplary conduit 606 is shown with a rectangular cross section. However, it should be recognized that the conduit 606 could be configured in several alternative cross sections including: round, square, triangular or any other suitable cross section. It should also be appreciated that the pass through 504 may include a removable panel (not shown) for closing the pass through 504 when it is not in use.

Figure 7:
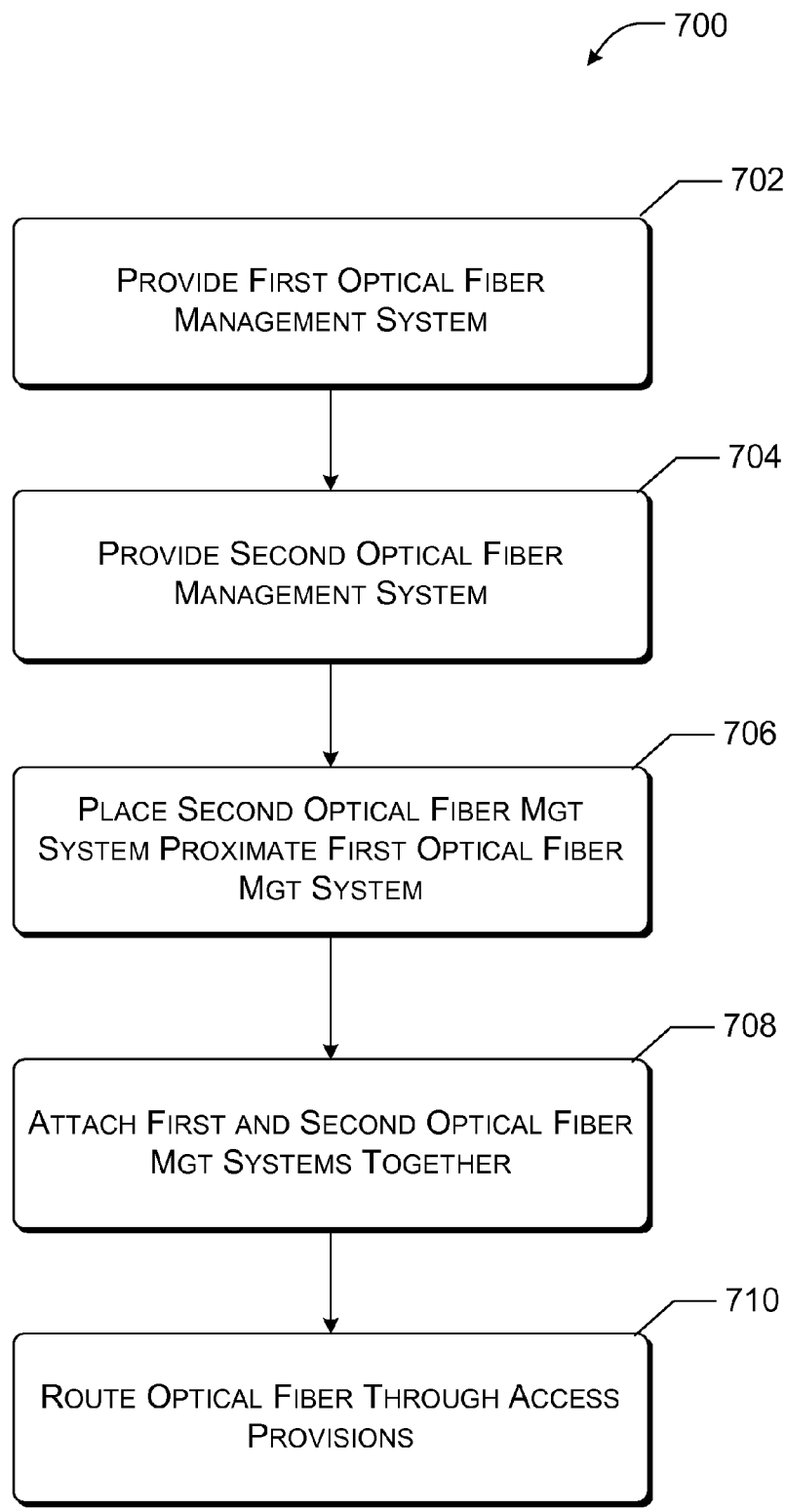
FIG. 7 is a flow chart depicting another illustrative method of managing optical fiber.

FIG. 7 depicts an illustrative method of managing optical fiber. A first optical fiber management system 500 system is provided, at block 702. The first optical fiber management system 500 may be prepared for installation by removing one or more access panels 502, removing a side (104, 106, 108, 110, 112), accessing a pass through 504, or placing one or more holes (not shown) in the cabinet 101. Alternatively, the first optical fiber management system 500 may already be configured for installation.

A second optical fiber management system 500 is provided, at block 704. The second optical fiber management system 500 may also be prepared for installation by removing one or more access panels 502, removing a side (104, 106, 108, 110, 112), removing a panel covering a pass through 504, or placing one or more holes (not shown) in the cabinet 101. Alternatively, the second optical fiber management system 500 may also be preconfigured for installation.

The second optical fiber management system 500 is then placed proximate the first optical fiber management system 500, at block 706. The second optical fiber management system 500 may be place on top, below, or adjacent the first optical fiber management system 500 such that an optical fiber may pass between them.

The first and second optical fiber management systems 500 are aligned in order to align the open access panel(s) 502 and/or pass through(s) 504 and coupled the management systems together, at block 708. As previously noted, the optical fiber management systems 500 contain provisions 506 for attaching them together. The attachment provisions 506 may include bolts, screws, cam locks, rivets or other suitable means of attaching the systems 500 together. The optical fiber management systems 500 may also include provisions for sealing the facing surfaces between the systems 500 to prevent water and contaminates from entering the cabinets 101. The sealing provisions may include gaskets, a face seals, O-rings or other suitable means of sealing the surfaces between the systems 500.

Next, one or more fiber optic cables are routed through the access provisions in the systems 500, at block 710. The cables could be routed from the first to the second optical fiber management system 500 or alternatively from the second to the first optical fiber management system 500. Additionally, any number of additional optical fiber management system 500 may be attached in a similar manner.

Illustrative Restoration of Optical Fiber Communication

As previously noted, businesses and consumers depend on digital communications to conduct business, communicate with friends and family members, and receive important information. Today's optical fiber communication systems must be robust and reliable. However, a single optical fiber is the size of a human hair and is relatively easily to damage or break a fiber.

Figure 8:
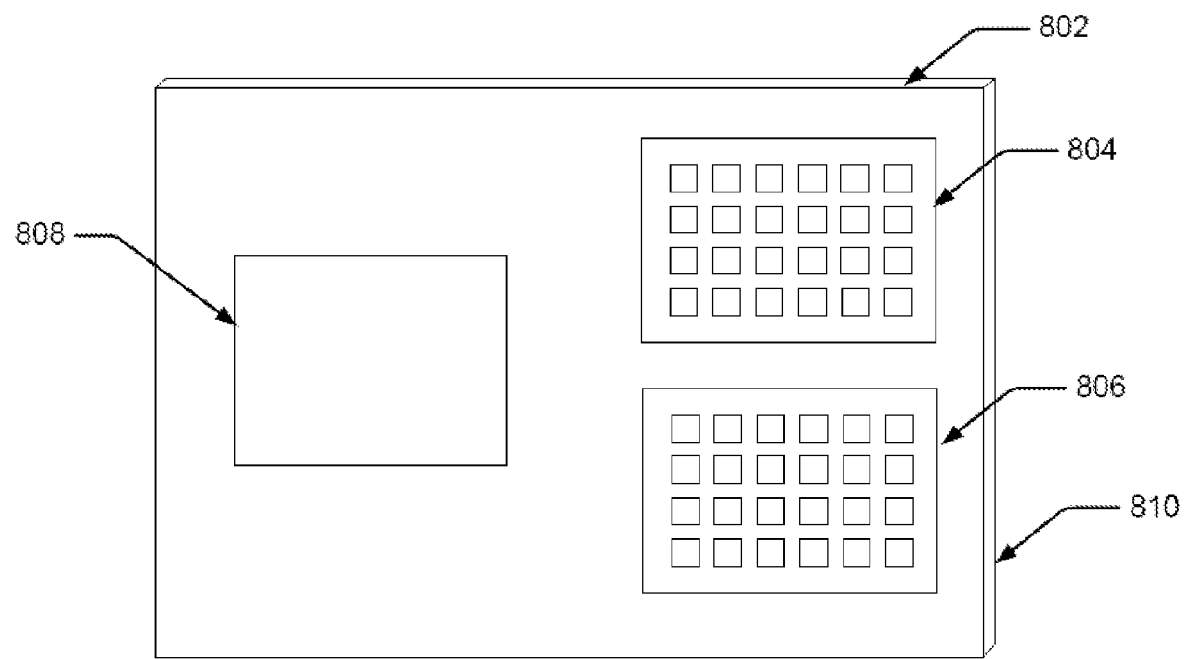
FIG. 8 is a schematic view of an illustrative panel for mounting optical circuits including a parking lot for terminating optical fibers that are not in use.

FIG. 8 depicts an illustrative panel 802 that is part of an optical fiber management system. The panel 802 is mounted inside a cabinet 101 that is configured to manage optical fiber. Alternatively, the panel 802 could be mounted to a wall, a rack or other suitable support structure. The illustrative panel 802 includes a plurality of feed adapters 804 that are mounted in a block like arrangement along the top of the panel 802. In general, a typical fiber optic cable contains 24 individual optical fibers and accordingly requires 24 feed adapters 804. However, any suitable number of feed adapters 804 could be employed, depending on the size of the fiber optic cable and the design of the fiber management system. The panel 802 may also include a parking lot 806 for terminating optical fibers that are not currently being used. The representative parking lot 806 contains provisions for 24 individual optical fibers. However, any number of optical fibers could be terminated in the parking lot 806. For example, in one implementation the optical fiber management system receives at least one 24 termination fiber optic cable and at least one optical fiber is terminated in the parking lot 806. In an alternate implementation, the optical fiber management system receives at least one 24 termination fiber optic cable and at least six optical fibers are terminated in the parking lot 806. In a further alternate implementation, the optical fiber management system receives a fiber optic cable comprising a plurality of optical fibers and one half the plurality of optical fibers are terminated in the parking lot 806.

In an alternate implementation, the panel 802 may contain a door 808 or other provision for accessing the back of the panel 810. The door 808 may be used to access the backside of the optical fiber terminations, reroute circuits, or clean the terminations. In further alternate implementations, the feed adapters 804 and parking lot 806 could be located on the same side of the panel 802.

Once an optical fiber is installed and is in use, there is the possibility that the fiber may become damaged or broken, thus preventing data from being transmitted over the fiber. This can be significant issue when transmission capacity is limited and communications must be restored quickly.

Figure 9:
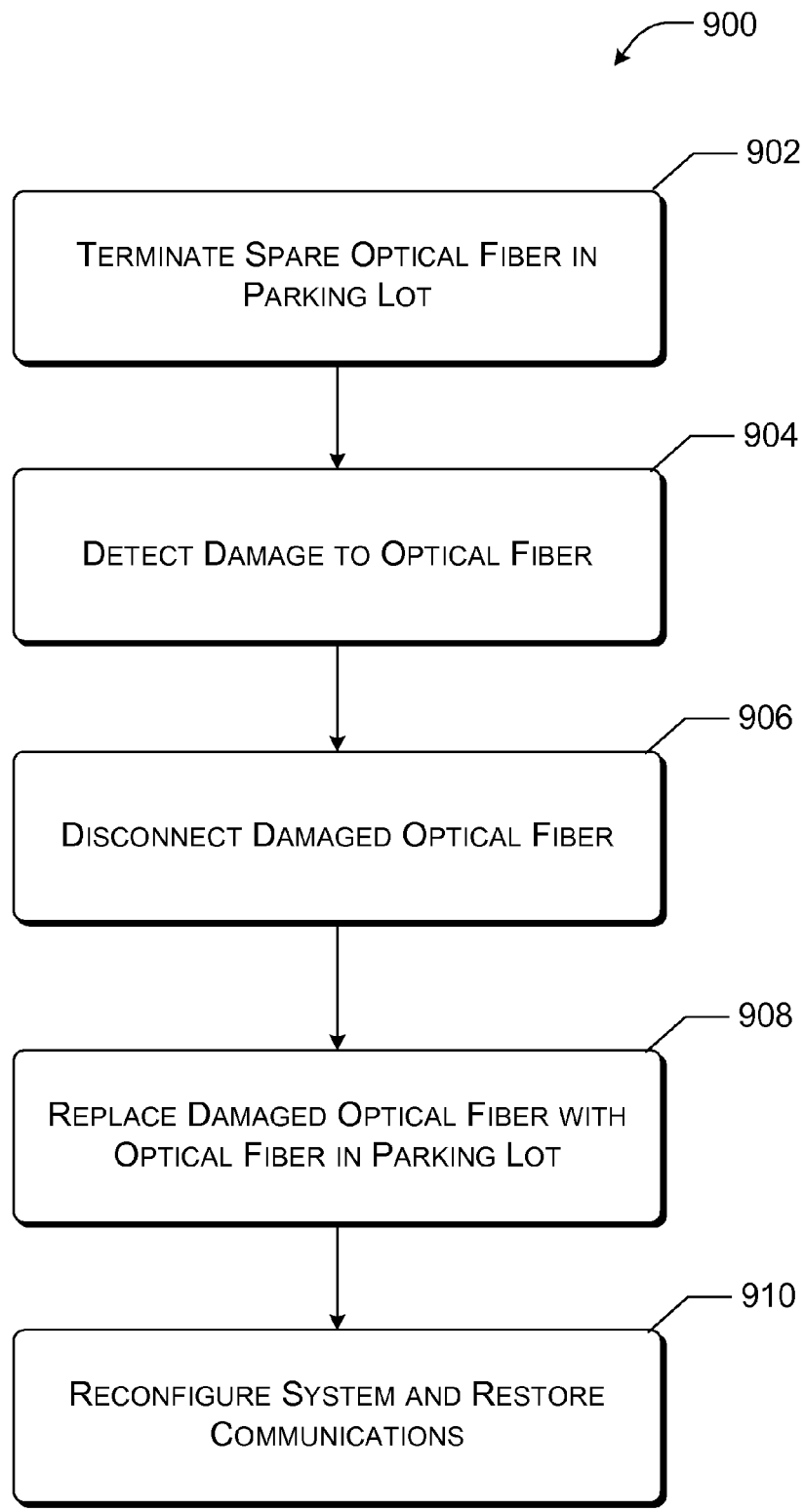
FIG. 9 is a flow chart depicting an illustrative method of restoring fiber optic communication.

FIG. 9 depicts an illustrative method of restoring fiber optic communications in accordance with an implementation. Typically when fiber optic cables are laid the cable service provider includes additional capacity to accommodate future demand. These unused fibers are routed to panel 802 and terminated in the parking lot 806, at block 902.

Damage to an optical fiber may be detected by measuring the data rate transmitted by the fiber. If the data rate falls below a threshold value or if the fiber stops transmitting all together, a photo detector receiver (not shown) can be used to detect the damage to the fiber, at block 904. Once the damaged fiber has been detected, a service technician or repair person is notified and the damaged fiber is disconnected from its feed adapter 804, at block 906. The service technician then removes a spare optical fiber from the parking lot 806 and places it in the vacant feed adapter 804, at block 908. The fiber optic communications system is then reconfigured to transmit data over the spare fiber and the communications is restored, at block 910. Alternatively, the service technician may test the circuit to verify that the connection has been properly made and the spare fiber is not damaged.

While several illustrative implementations of structured cabling installations have been shown and described herein, it should be understood that the features of each of the installations may be rearranged, omitted, modified, and/or combined with one another.

While several illustrative methods have been shown and described herein, it should be understood that the acts of each of the methods may be rearranged, omitted, modified, and/or combined with one another.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A communications equipment management system comprising:
    a first cabinet, the first cabinet comprising a first access feature for routing a communications fiber from the first cabinet;
    a second cabinet, the second cabinet comprising a second access feature for routing the communications fiber to the second cabinet;
    an attachment provision to attach the first cabinet to the second cabinet;
    a sealing provision to seal a junction between the first cabinet and the second cabinet, the junction comprising facing surfaces of the first cabinet and the second cabinet, the sealing provision configured to seal the junction while allowing the communications fiber to be routed through the first access feature and the second access feature; and
    a pass-through for routing the communications fiber from the first cabinet through the pass-through and the first access feature to the second cabinet through the second access feature, wherein the pass-through comprises a first opening, a second opening, and a conduit.

2. A communications equipment management system as recited in claim 1, wherein the first and second access features comprise a removable access panel, a removable side panel, a removable back panel, a removable top panel, or a removable bottom panel.

3. A communications equipment management system as recited claim 1, wherein the attachment provision comprises a bolt, a screw, a rivet, a clip, or an adhesive.

4. A method of managing communications equipment as recited in claim 1, wherein the sealing provision comprises a gasket, a face seal, an O-ring, or silicone sealer.

5. A communications equipment management system as recited claim 1, wherein the second cabinet is placed on the top of the first cabinet, placed below the first cabinet, or placed adjacent to the first cabinet.

6. A communications equipment management system as recited claim 1, wherein the first cabinet and the second cabinet are mounted to a utility pole.

7. A method of managing communications equipment comprising:
    providing a first cabinet to manage a communications fiber, the first cabinet comprising a first access feature and a pass-through for routing the communications fiber from the first cabinet, wherein the pass-through encloses and isolates a first area containing the communications fiber from a remaining portion of the first cabinet;
    providing a second cabinet for managing a communications fiber, the second cabinet comprising a second access feature for routing the communications fiber to the second cabinet;
    placing the second cabinet proximate the first cabinet such that the communications fiber may pass from the first cabinet through the pass-through and the first access feature to the second cabinet through the second access feature; and
    attaching the first cabinet to the second cabinet with at least one connector.

8. A method of managing communications equipment as recited in claim 7, wherein the second cabinet is placed on the top of the first cabinet, placed below the first cabinet, or placed adjacent to the first cabinet.

9. A method of managing communications equipment as recited in claim 7, wherein the access feature comprises a removable access panel, a removable side panel, a removable back panel, a removable top panel, or a removable bottom panel.

10. A method of managing communications equipment as recited in claim 7, wherein the connector comprises a bolt, a screw, a rivet, a cam lock, or an adhesive.

11. A method of managing communications equipment as recited in claim 7, further comprising passing at least one communications fiber from the first cabinet to the second cabinet through the pass-through, the first access feature, and the second access feature.

12. A method of managing communications equipment as recited in claim 7, further comprising aligning the first access feature with the second access feature prior to attaching the first cabinet to the second cabinet.

13. A method of managing communications equipment as recited in claim 7, further comprising sealing a junction between the first cabinet and the second cabinet.

14. A method of managing communications equipment as recited in claim 13, wherein the junction is sealed by a gasket, a face seal, an O-ring, or a silicone sealer.

15. A cabinet for managing communications equipment comprising:
    a first surface, the first surface comprising a first access feature;
    a second surface, the second surface substantially parallel to the first surface and comprising a second access feature;
    a pass-through for routing a communications fiber from the first access feature to the second access feature, wherein the pass-through encloses and isolates a first area containing the communications fiber from a remaining portion between the first and second surfaces;

an attachment provision for attaching the cabinet to a second cabinet for managing communications equipment, the attachment provision proximate at least one of the first and second access features; and a seal surrounding at least one of the first access feature and second access feature.

16. A cabinet for managing telecommunications equipment as recited in claim 15, wherein the first surface and the second surface comprise a top surface and a bottom surface and the pass-through runs between the top and bottom surfaces.

17. A cabinet for managing telecommunications equipment as recited in claim 15, wherein the pass-through runs along a corner of the cabinet.

18. A cabinet for managing telecommunications equipment as recited in claim 15, wherein the pass-through runs along an outside surface of the cabinet, the pass-through being exterior to the cabinet.

* * * * *